Oct. 9, 1923.

E. W. MILLER

GEAR SHAPING MACHINE WITH SIDE TRIMMING ATTACHMENT

Filed Nov. 15, 1921

INVENTOR
Edward W. Miller
by Wright, Brown, Quinby & Mary
attys

Oct. 9, 1923.

E. W. MILLER 1,470,229

GEAR SHAPING MACHINE WITH SIDE TRIMMING ATTACHMENT

Filed Nov. 15, 1921    8 Sheets-Sheet 7

INVENTOR
Edward W. Miller
by Wright, Brown, Quinby & May
Att'ys

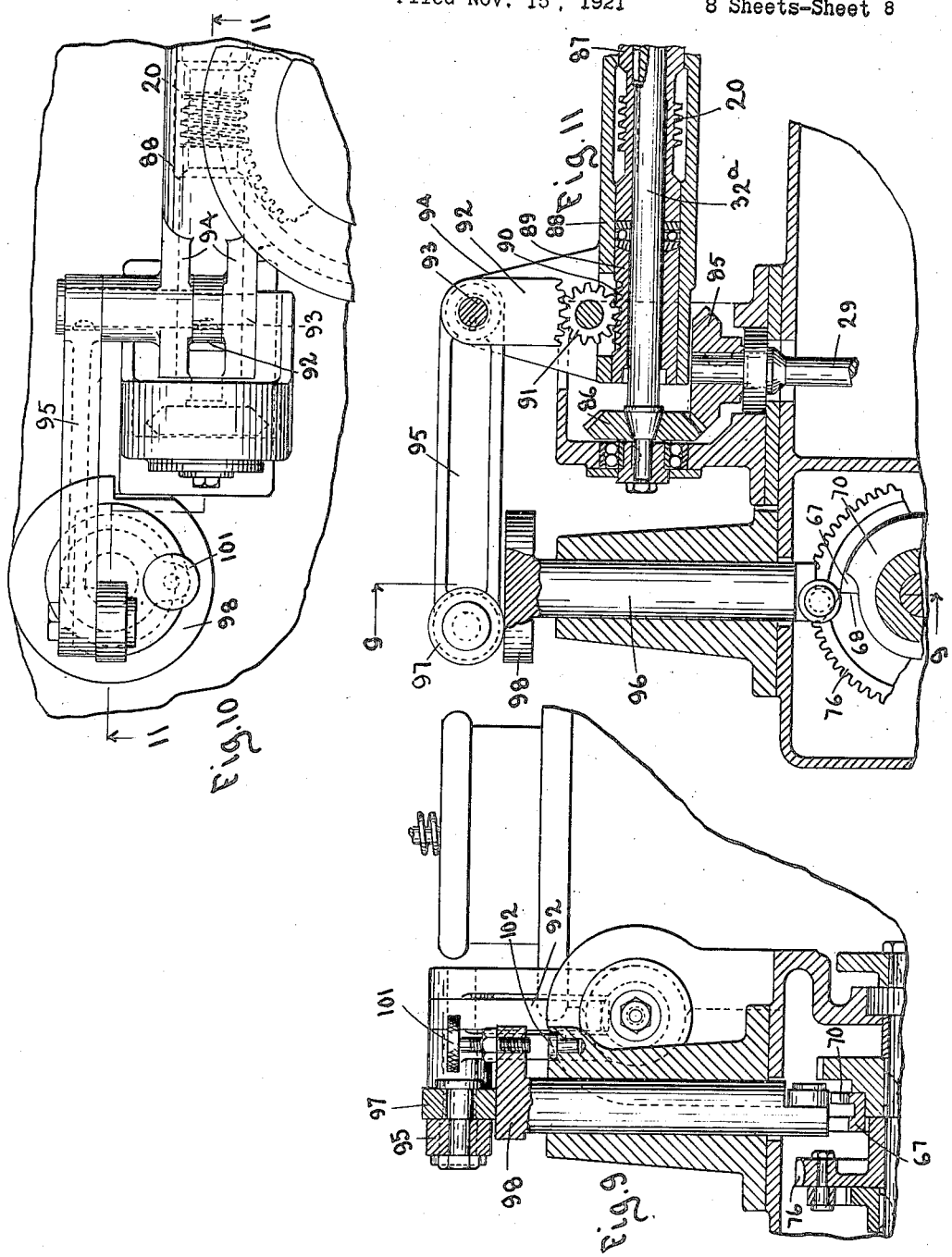

Patented Oct. 9, 1923.

1,470,229

UNITED STATES PATENT OFFICE.

EDWARD W. MILLER, OF SPRINGFIELD, VERMONT, ASSIGNOR TO THE FELLOWS GEAR SHAPER COMPANY, OF SPRINGFIELD, VERMONT, A CORPORATION OF VERMONT.

GEAR-SHAPING MACHINE WITH SIDE-TRIMMING ATTACHMENT.

Application filed November 15, 1921. Serial No. 515,292.

*To all whom it may concern:*

Be it known that I, EDWARD W. MILLER, a citizen of the United States, residing at Springfield, in the county of Windsor and State of Vermont, have invented new and useful Improvements in Gear-Shaping Machines with Side-Trimming Attachments, of which the following is a specification.

The present invention relates to gear generating machines and has for its object to reduce the thickness of teeth cut in a work piece on such a machine by cutting away or trimming such teeth on one side by a continuation of the cycle of the machine. The nature of the invention may, therefore, be briefly expressed as a means for side trimming the teeth of a gear blank in a gear generating machine, following the generating and cutting of such teeth in the first instance.

In principle and in the scope in which I claim protection, the invention is applicable to and may be embodied in any type of gear generating machine, whatever may be the precise character of the cutting instrument or of the rolling movement caused to occur between the cutter and work piece to generate the tooth forms, or whatever may be the means employed to give such movement. I have chosen for illustration, however, the application of the invention to a gear generating machine of the shaper type in which the cutter operates with a planing action and has itself the shape and outline of a spur gear, and the generating movement is effected by rotating the cutter and work piece about their respective axes with the same peripheral speed at their pitch circles.

In the case of such machines trimming of the teeth cut in the work piece is required on occasion to produce gears having teeth of less than standard width by the operation of a standard cutter, or to make standard gears by the use of a cutter of which the tooth like peripheral projections are thinner than those of a standard cutter. These instances do not include all the cases where side trimming of the work piece may be called for, but they illustrate the purpose and utility of the invention.

The new step made by this invention consists, broadly, in the combination with a gear generating machine having the necessary means and mechanism for causing cutting and generating movements to occur between the cutter and work piece, of suitable mechanism adapted and operable to shift either the work piece relatively to the cutter, or the cutter relatively to the work piece, in a manner substantially similar, or opposite, to the shifting of such element which occurs in the ordinary course of generative movements; said mechanism being controlled and caused to act when a series of teeth have been cut in the work piece in order that by the continuing cycle of the machine the teeth previously cut may be trimmed off on one side.

This object may be effected in various ways and by various forms of mechanism, two of which forms are described in detail in the following specification and are shown in the accompanying drawings, to illustrate by disclosure of specific embodiments the nature and principles of the invention. In one of these illustrated embodiments the angular shift in the relation of the cutter to the work is caused by retarding or arresting the rotational movement of the cutter while the work piece continues to rotate at the same rate, and in the other it is caused by driving the cutter rotationally ahead of the work.

Referring to the drawings:

Figure 9 is a sectional elevation seen from the same point of view as Figure 3 of the second of the beforementioned forms of the invention adapted to be applied in a machine of the sort shown in the preceding figures.

Figure 10 is a plan view of the mechanism shown in Figure 9.

Figure 11 is a sectional view of the same mechanism taken on line 11—11 of Figure 10.

Like reference characters designate the same parts wherever they occur in all the figures.

Figure 1:
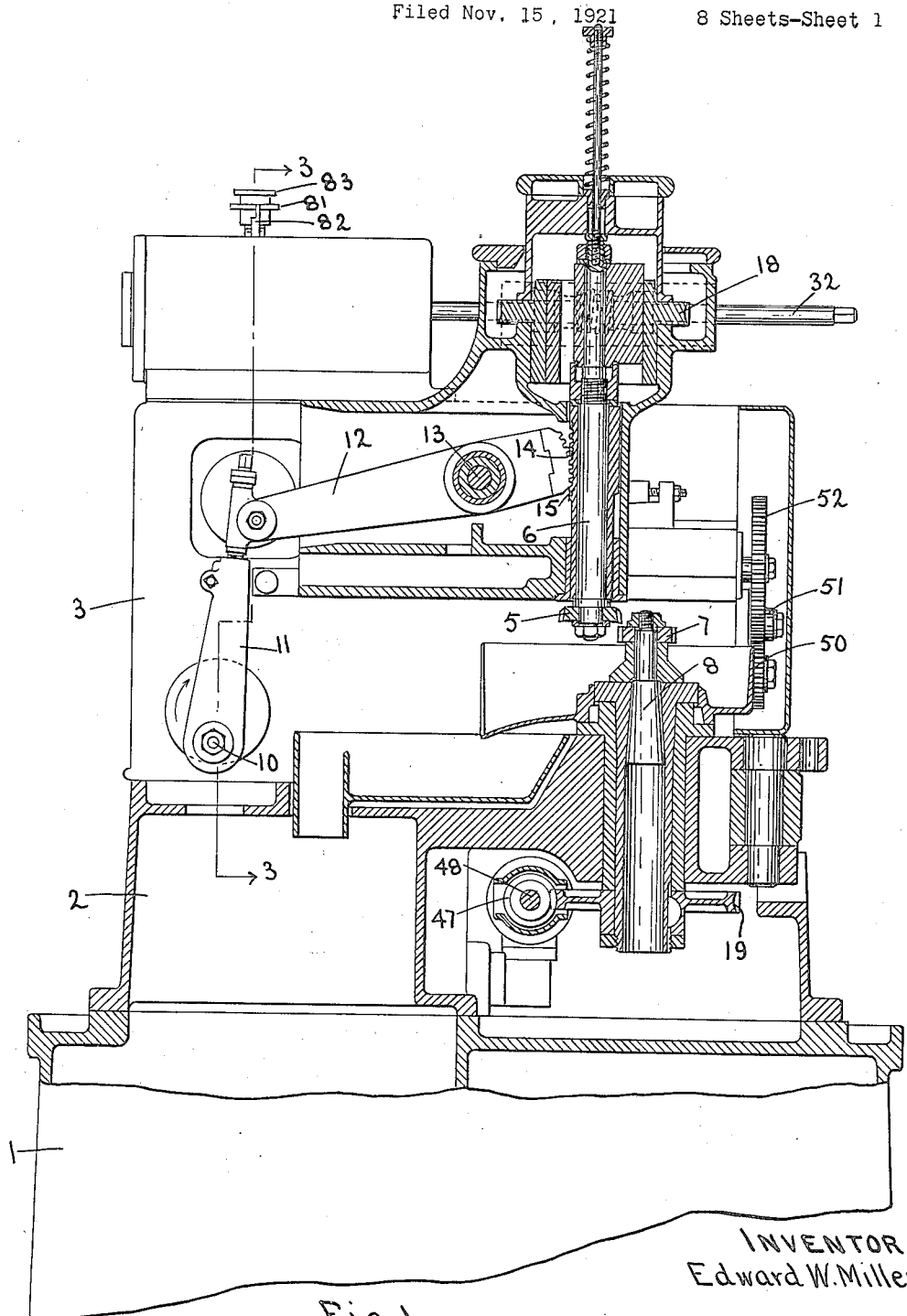
Figure 1 is a vertical section and partial elevation of the machine equipped with the first form of the invention hereinabove referred to. The location of the section represented in this figure is indicated by the line 1—1 in Figure 3.

In the following description, it will be assumed that the machine illustrated is prepared for making spur gears with spaces between the teeth thereof wider on the pitch circle than the width, on its pitch line, of the peripheral projections of the cutter, and that the cutting edge of the cutter is similar in outline to the outline of a spur gear; but without intending thereby to limit the scope of the protection which I claim in respect to the uses to which the machine may be put.

The working parts of the machine are supported by a base 1 and a superstructure consisting of the parts 2, 3, etc., of any suitable construction and arrangement. 5 represents the cutter, 6 the cutter-carrying spindle, 7 the work piece, and 8 the work-carrying spindle.

Reciprocating motion is given to the cutter from a main shaft 9, by means of a crank pin 10 on the end of said shaft, a connecting rod 11, and a lever 12, which is pivoted on a stationary stud 13 and carries a gear segment 14, meshing with a rack 15, extending longitudinally of the cutter spindle 6 and confined against relative endwise movement between a collar and an abutment nut thereon. The main shaft is driven by a belt 16 when such belt is engaged with a pulley 17 fast on the shaft.

Rotative generating movement is given to the cutter and work piece simultaneously at the same linear speed at their pitch circles by means of worm wheels 18 and 19 respectively. These wheels are called for the purpose of identification in the claims, "index gear wheels." The wheel 18 has motion-transmitting sliding engagement with the spindle 6 in a manner well known in this art, and is itself restrained from endwise movement by its housing. Its motion is derived from a worm 20, through the following mechanism:—a worm 21 on the main shaft drives a worm wheel 22 on a shaft 23, and on the latter shaft is mounted a spur gear 24, in mesh with a gear 25 on a shaft 26. To the shaft 26 is keyed a bevel gear 27, meshing with a bevel gear 28 on an upright shaft 29; and shaft 29 carries a bevel pinion 30, meshing with a bevel gear 31, which is loose on the spindle or shaft 32 of the index worm 20. The bevel gear 31 has a long sleeve or quill 33, which rotates in bearings 34 and 35 held in the frame, and on the quill is keyed a gear 36, which meshes with a pinion 37 (Figure 6), made fast to a gear 38, which meshes with a pinion 39 keyed to the shaft or spindle 32. The connected pinions 37 and 38 are supported by a spindle 40, which turns in bearings 41 and 42 in a cage 43, and this cage is rotatable about the axis of the shaft 32, being keyed to a shaft 44 aligned with shaft 32 and carrying a face plate 45, supported by a bearing 46 on the quill 33. Thus, if the cage 43 remains stationary the worm 20 is driven through a simple gear train at a speed which is determined by the ratios of the several pairs of intermeshing gears. In this particular machine, the ratio of gears 30 to 31, and 37 to 36 is one to two, while 38 and 39 are equal to each other, whence the worm shaft 32 turns at the same speed as the shaft 29 when the cage is stationary. The gears 37 and 38 have the relation to gears 36 and 39 of planet pinions to sun gears, since they are rotatable with the cage around gears 36 and 39. Hence they may be designated as planet pinions, and the cage 43 as a planet pinion carrier.

The worm wheel 19 on the work spindle is directly driven by a worm 47 on a shaft 48, which receives rotary motion from the shaft 26 through the following mechanism:—the shaft 26 drives a shaft 49 through a train of changeable gears 50, 51 and 52, and shaft 49 drives an upright shaft 53, by means of miter gears 54 and 55. Shaft 53 is coupled to and is virtually a part of a shaft 56, which carries a bevel gear 57, in mesh with a bevel gear 58 on the worm shaft 48.

The foregoing describes in complete detail the mechanism by which cutting and rotating generating movements are given to the cutter and work piece. Other features of the gear-shaping machine, which have to do with feeding the cutter into the work to obtain the proper depth of cut, for stopping the machine automatically at the end of the cycle, and for making adjustments of various sorts, are not illustrated or described, because they are not material to the disclosure of the present invention; and because such invention may be applied to machines differing widely from one another in respect to the means for these purposes with which they may be equipped.

Figure 6:
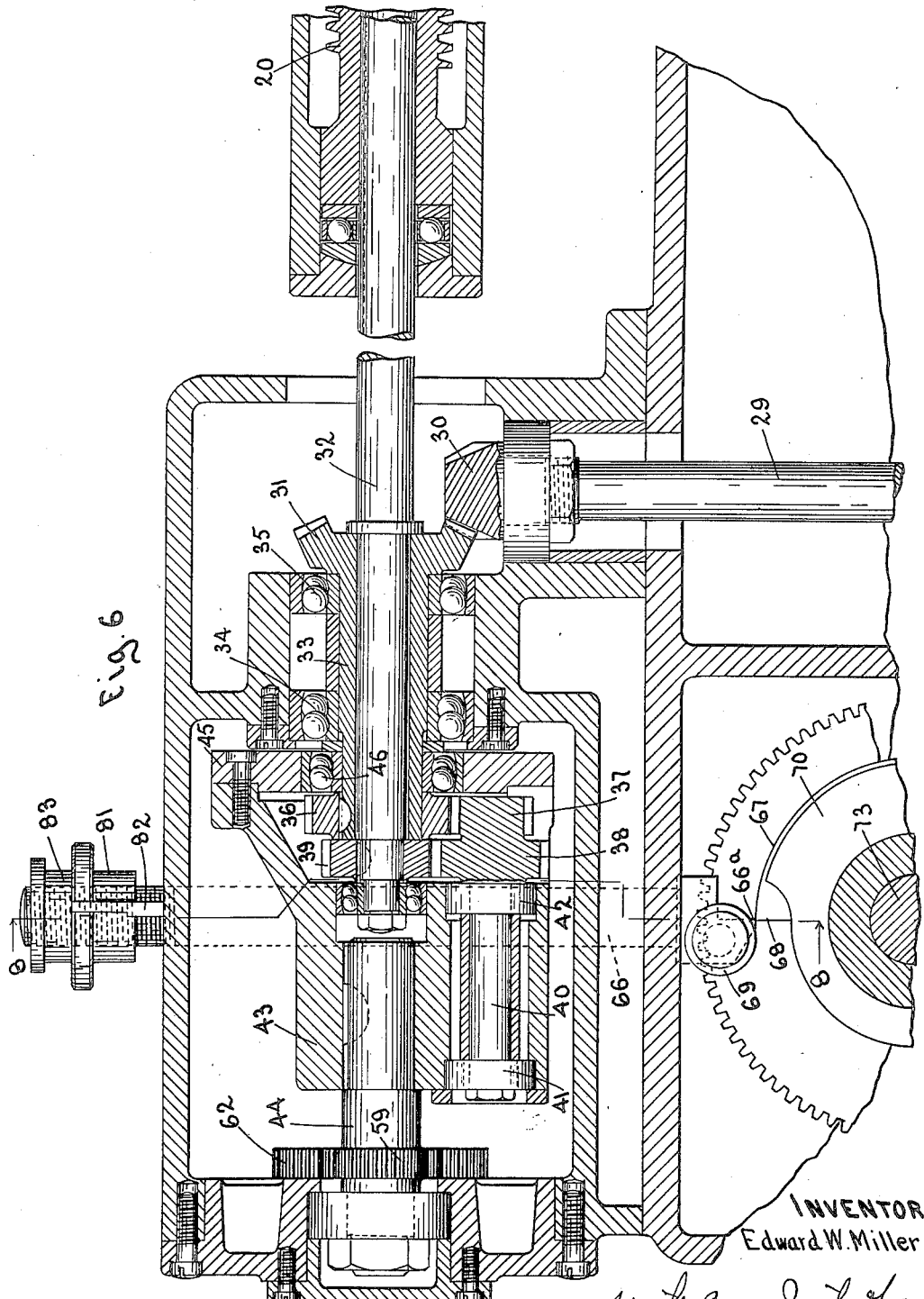
Figure 6 is a vertical section in detail on an enlarged scale of the planetary transmission gearing by which the side-trimming shift of the cutter is directly effected.
Figure 7:
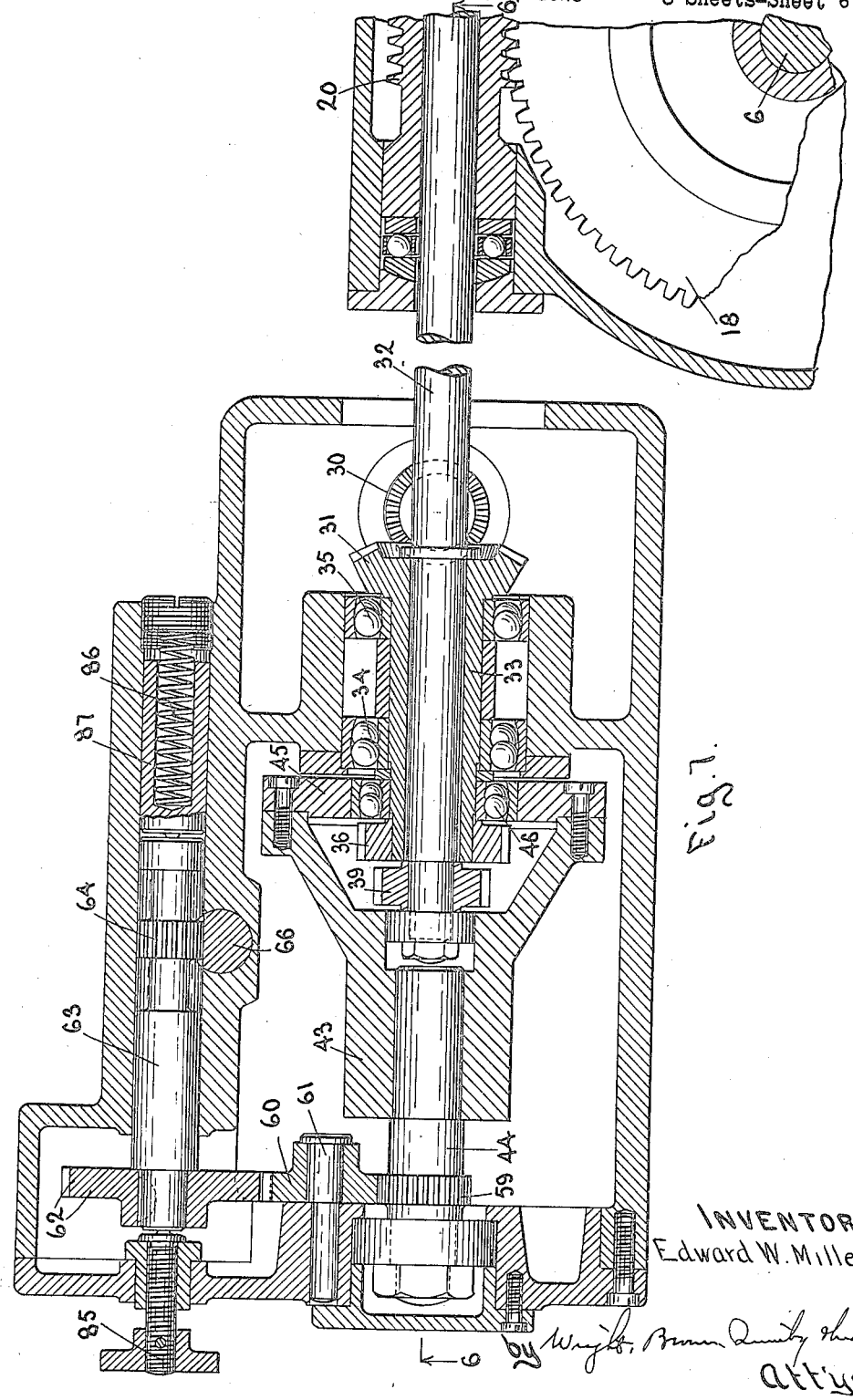
Figure 7 is a horizontal section on the same scale as Figure 6 of the same mechanism.
Figure 8:
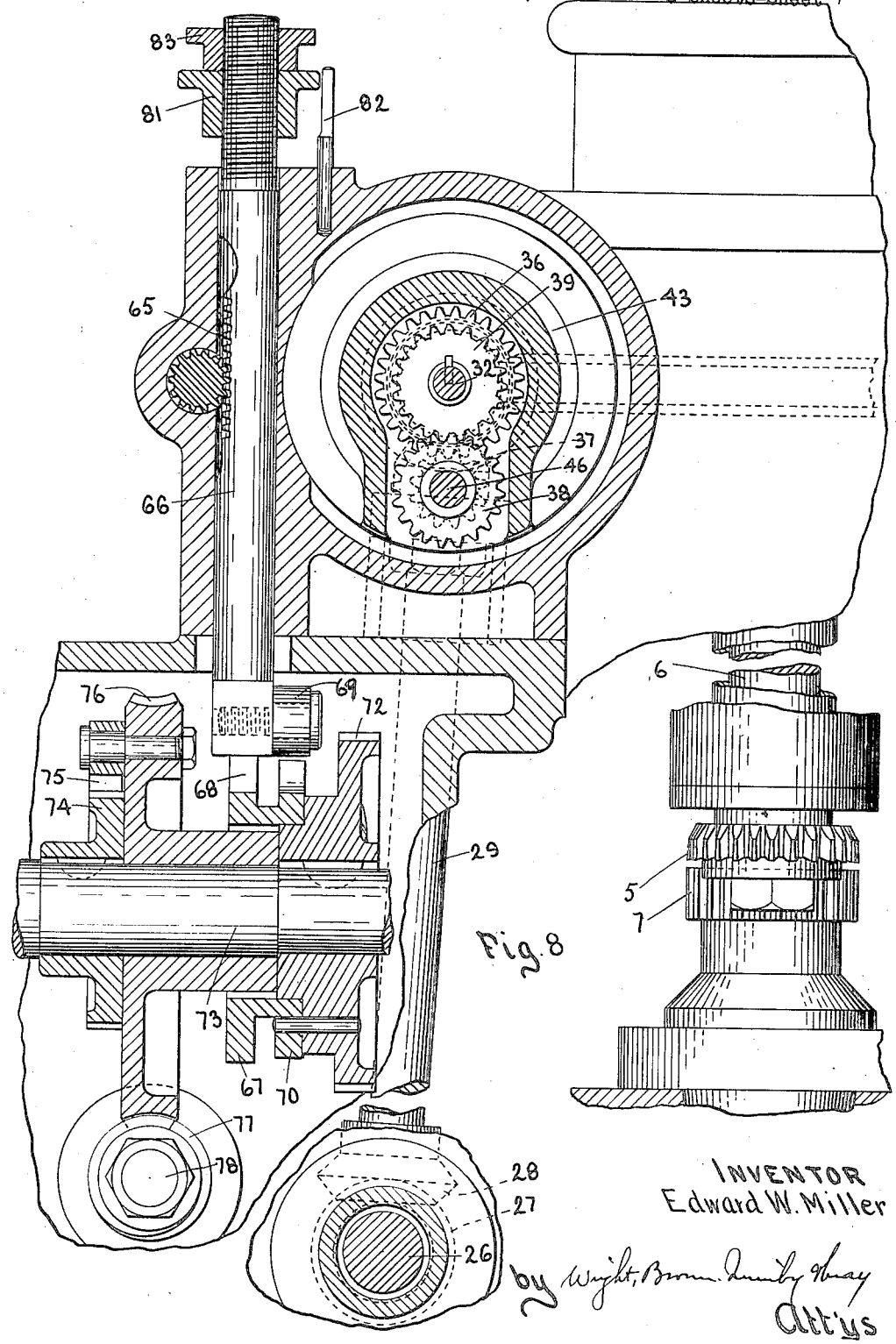
Figure 8 is a vertical section of the same mechanism, taken on the line 8—8 of Figure 6.

Referring now to Figures 6, 7 and 8, the shaft or stud 44 carries a pinion 59, meshing with an intermediate pinion 60 on a stud 61, which meshes with a gear 62 keyed to a shaft 63. Shaft 63 is provided with a pinion 64, with which meshes a series of teeth 65 forming a rack on the side of an endwise movable bar 66. The lower end of this bar is adapted to rest on the high part of a cam 67, and is cut back on one side to form a square end or shoulder 66ª so that it may fall suddenly when the radial offset or drop 68 of the cam passes it in the direction of the arrow shown in Figure 2. A roll 69 is carried by the bar 66, and serves, in co-operation with a disk 70 associated with the cam 67, to raise the bar with diminished friction when the rising offset 71 of the cam approaches the bar. This disk and roll raise the bar nearly to the uppermost position of the latter; and it is fully raised to that position by the summit of offset 71 and then held there while a high dwell on one side of the cam from the rise 71 to the shoulder 68 passes under it. At the opposite side of the cam, from the radial shoulder 68 to the rise 71 is a low dwell which has no lifting effect on the bar; and the only part of disk 70 which moves the bar is a rise thereon far enough ahead of the rise 71 to press inward on roll 69 just before rise 71 reaches the bar.

Cam 67 and disk 70 are made fast to a gear wheel 72, keyed to a shaft 73, on which there is also keyed a ratchet wheel 74, driven by a pawl 75 from a worm wheel 76, loose on shaft 73 and driven by a worm 77. The latter worm is on a shaft 78, which carries a gear 79, driven from the shaft 49 by a pinion 80. The connection, by means of pawl 75 and ratchet 74, between the worm wheel 76 and the cam causes the latter to be positively driven in the direction of the arrow in Figure 2 while the machine is running, but allows the cam to be moved ahead of the gearing by hand so as to raise the bar, before the machine is started in automatic operation on a new work piece. The gear train which drives cam 67 and disk 70 is of such value with respect to the train which drives the work spindle 8, and the high dwell of the cam is such length that, during the time required for the high dwell to pass bar 66, the cutter may be fed to the required depth in the work piece, and a complete series of teeth may be cut; while the low dwell from cam shoulder 68 to the rise of disk 70 is so long that, during the travel past the bar, the work piece may be given another complete rotation.

The upper end of the ratchet bar 66 projects above the machine frame and is screw-threaded. A nut 81 is threaded on this projecting end, to serve as an adjustable abutment, limiting the possible descent of the bar, and it carries graduations, which are read in connection with an index 82 rising beside it from the frame. Lock nut 83 is also threaded upon the bar and secures the abutment nut in its various adjustments.

The worm shaft 32 extends beyond the worm housing, and is adapted to be turned by hand for adjusting or setting the cutter in the first instance. In order that it may be thus turned by hand the cage 43 is disconnected from the rack bar by moving the gear 62 endwise out of mesh with the intermediate wheel 60, through the agency of a screw 85, having a threaded mounting in the frame and bearing on the end of shaft 63. The opposite end of this shaft is pressed upon in the opposite direction by a spring 86 through a guide thimble 87, whereby it is made possible to displace the gear 62 to the desired extent, and to return the rack gear into mesh with the intermediate pinion when the disabling screw 85 is backed off.

The operation of the machine thus described is readily understood. It being assumed that a proper cutter and work piece have been mounted on the spindles, and that the cutter has been placed near enough to the work to begin cutting shortly after the machine shall have been started, and that the cam 67 has been so placed as to hold the rack bar 66 in raised position, and it being further assumed that the machine has a suitable means for automatically feeding the cutter to the proper depth in the work during the first part of the cutting cycle, then the machine is started by shifting the driving belt 16 from the loose pulley to the fast pulley 17. The cutter is set in reciprocative movement, and both the cutter and work piece are set in rotating movement like that of an intermeshing pair of gears by the mechanisms described, and the cutter is fed to the proper depth in the work by whatever mechanism may be provided for that purpose. At this time the rack bar is supported by the high part of cam 67, and the carrier 43 of the planetary pinions 37 and 38 is thereby held against being displaced in the direction in which the thrust applied to these pinions by the driving sun gear 36 tends to rotate it.

When a series of teeth of uniform depth or length has been cut all around the blank, the shoulder 68 of the cam reaches the extremity of the rack bar, and allows the latter to drop to the distance permitted by the previous adjustment of the abutment nut 81. This nut may be placed at any point between the limits wherein respectively the bar does not move down at all and it moves to the full depth of the cam depression. A tendency to revolve the carrier 43 and planet pinions is always exerted by the sun gear 36, which tendency is resisted by the rack bar while such bar is supported either by the cam 67 or by the abutment nut 81. When the bar drops the carrier 43 is permitted to turn slightly, and the worm shaft 32 stands still, or at least its rate of rotation is diminished. Thus the cutter lags in its rotative motion while the work piece continues rotating at the uniform rate, whereby the cutter teeth are caused to overlap at one side the teeth already formed in the gear blank. This amount of overlap is determined by the adjustment nut 81, and can be regulated within close limits of accuracy. Continuation of the operation of the machine while the low dwell of cam 67, and that of disk 70, pass the bar 66, then causes the teeth previously cut to be each trimmed off at one side by the amount thus determined.

Figure 2:
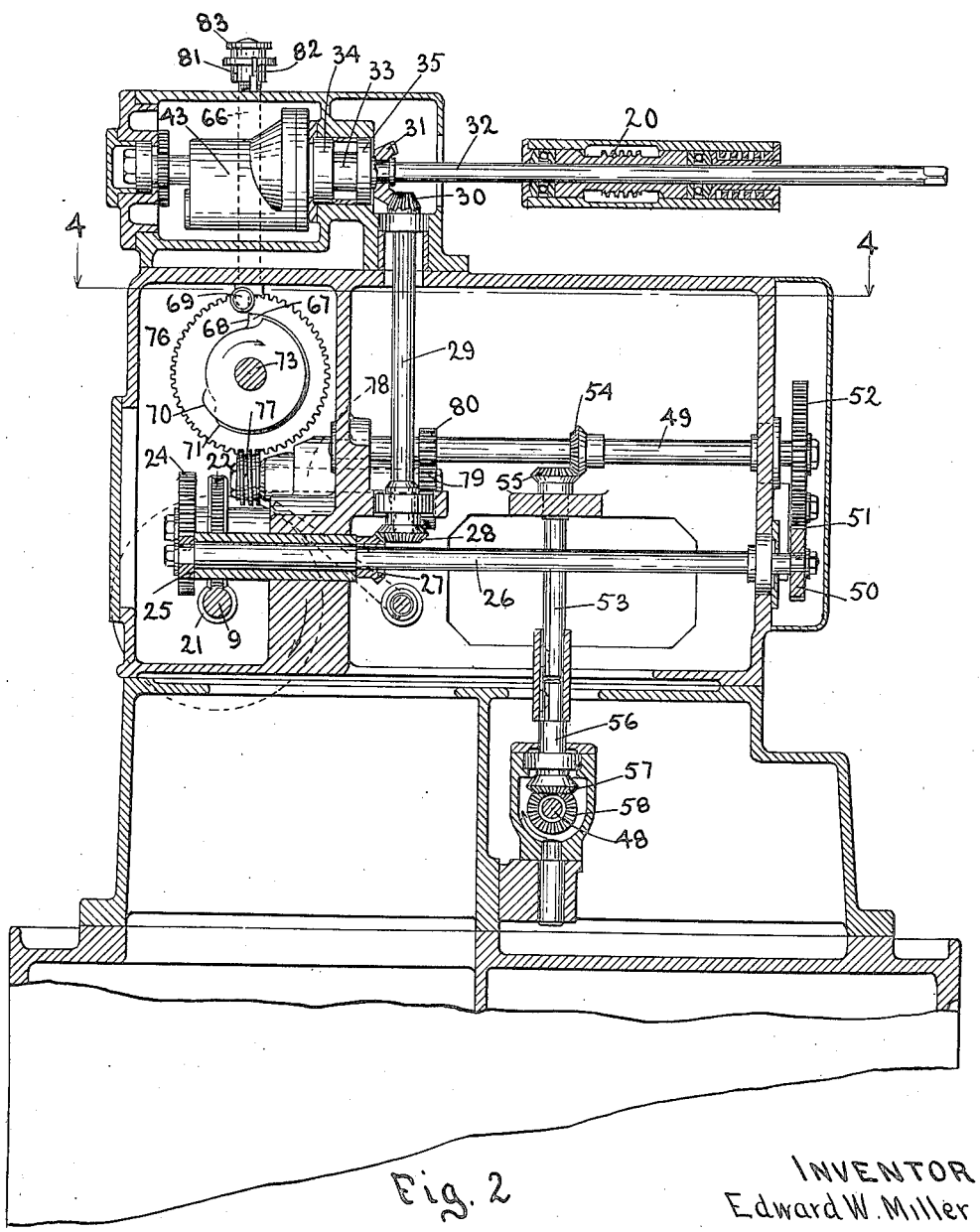
Figure 2 is a vertical section taken on a plane parallel to that of the section shown in Figure 1, the location of such plane being indicated by the line 2—2 in Figure 3.
Figure 3:
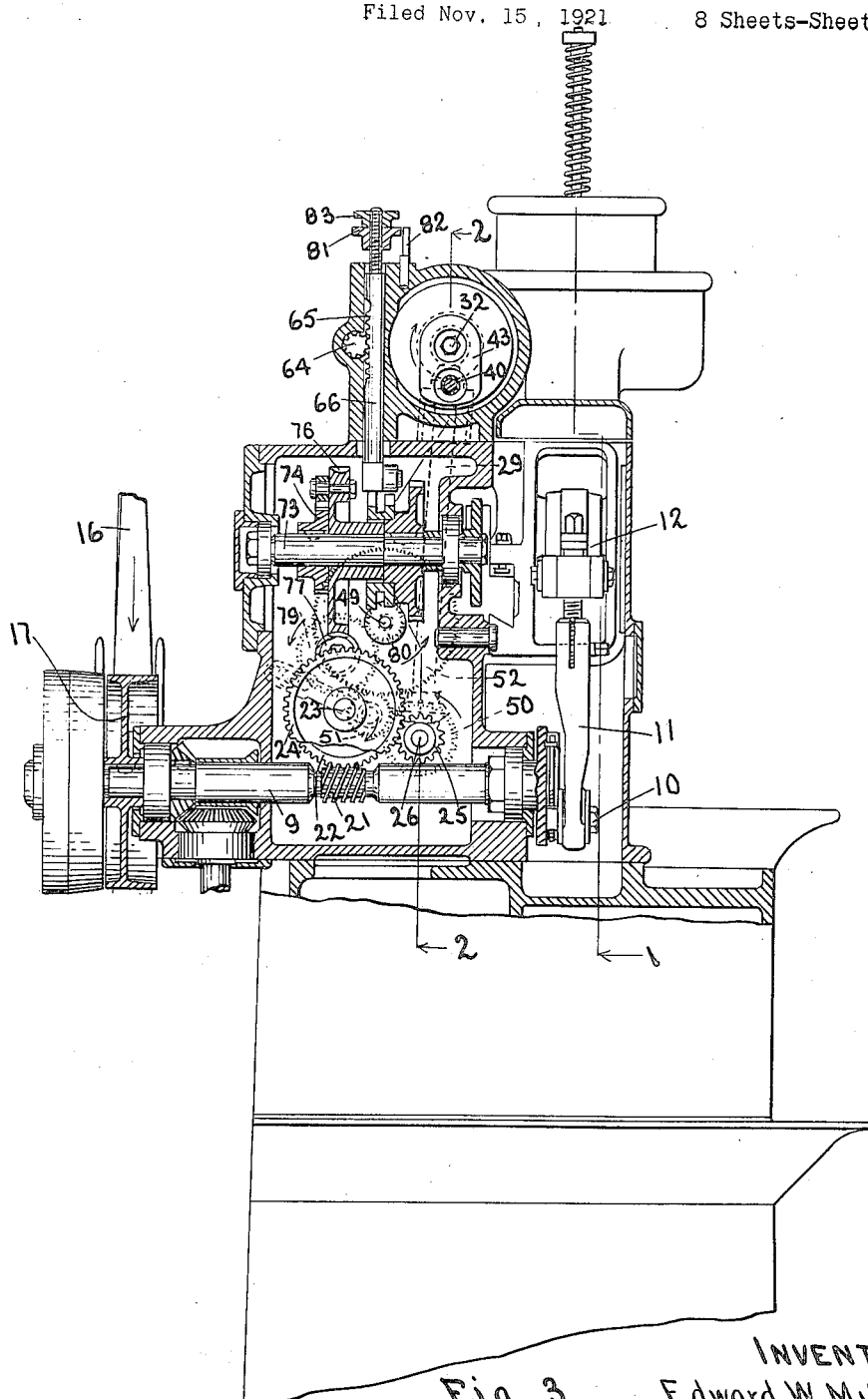
Figure 3 is a vertical cross section taken approximately on the plane of the line 3—3 in Figure 1.
Figure 4:
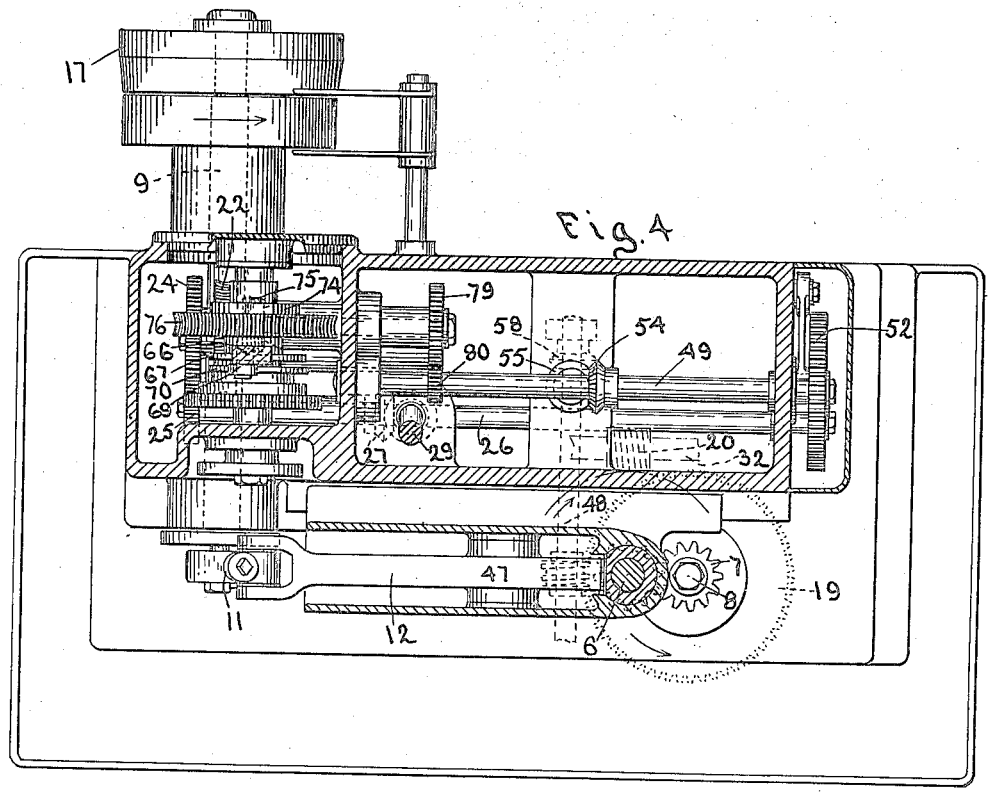
Figure 4 is a plan and horizontal section on the line 4—4 in Figure 2.

The mechanism shown in Figures 9, 10, and 11 comprising the second embodiment of the invention hereinbefore mentioned is adapted to be substituted for the mechanism particularly shown in Figures 6, 7 and 8 in a machine otherwise the same as that shown in Figures 1, 2, and 3, and having substantially the same worm 20 for rotating the cutter, shaft 29 for transmitting motion to said worm, and cam disks 67 and 70 associated with the worm wheel 76 as already described. In this modification, however, the worm shaft 32ᵃ is driven directly from the shaft 29 by a pair of bevel gears 85 and 86, and the worm is connected with said shaft by a spline 87 whereby it may slide endwise. The worm box or housing 88 is lengthened enough to hold a slidable bushing 89 having rack teeth 90. An idler pinion 91 meshes with the teeth 90 and also with the teeth on a gear segment 92, which is keyed to a rock shaft 93. Brackets 94 rising from the worm housing provide bearings for shaft 93 and the shaft of pinion 91. An arm 95 is also keyed so said rock shaft and this arm extends over a bar or plunger 96 corresponding to the rack bar 66 previously described and cooperating with the cam disks 67 and 70 in the same way. An antifriction roll 97 mounted on the end of arm 95 bears on a table 98 on the exposed or upper end of the bar.

Figure 5:
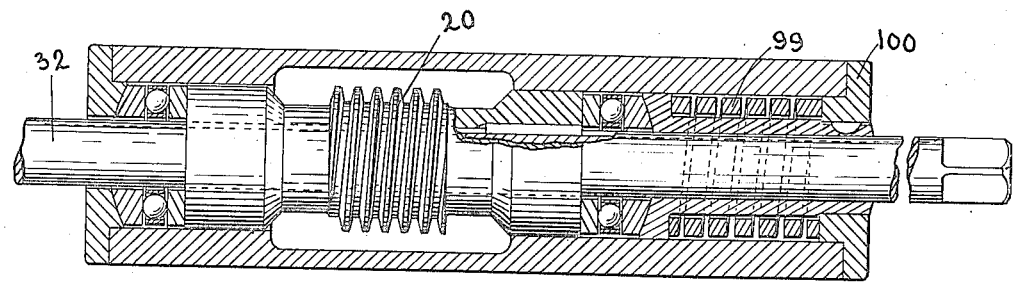
Figure 5 is a longitudinal section on an enlarged scale of the cutter-indexing worm and its bearing.

The worm 20 is pressed upon by a spring 99 (Figure 5) confined between a cover 100 on the end of the worm housing and a sleeve which is adapted to slide endwise in the housing and is pressed against the adjacent end thrust bearing of the worm. The pressure thus applied to the worm is transmitted through another end thrust bearing to the bushing 89, and from the latter to the arm 95 in such a direction that the roll 97 is held against the table 98 and the end of the plunger against the cam, ready to be moved downward when the offset 68 of the cam passes under the extremity of the plunger.

When this action occurs the worm is moved endwise and the cutter indexing worm wheel 18 is turned by the amount due to this displacement, in addition to the movement given it by rotation of the worm. That is, while the worm continues rotating constantly at the same speed, it is given an endwise movement in addition, and the extent of such endwise movement determines the depth of the side-trimming cuts thereafter made in the work. Adjustment of the depth of side-trimming cut is given by a stop screw 101 threaded through the table 98 in line with an abutment 102 on the frame beside the plunger. Movement of the cutter carriage, of which the worm housing 88 is a part, may take place without displacing the position of the worm relatively to its complemental wheel because the roll 97 is able to travel freely across the surface of the table 98, and the mechanism works in the same way in whatever position the roll may occupy between the opposite edges of the table. The table may be made with whatever width is needed to permit feeding and withdrawing movements of the cutter carriage in connection with work pieces of various diameters.

Although both forms of the automatic means for effecting side-trimming here disclosed are applied to the cutter holder, I have not intended thereby to limit my protection in that respect. It is within my contemplation to provide equivalent means applied to the work holder for either retarding or accelerating its speed of rotation relatively to the cutter, temporarily, for a long enough period to effect an angular displacement of the cutter and work pieces of the sort needed for side-trimming. Other specific mechanisms than those here shown may also be used in connection with either the cutter or the work holder within the scope in which I claim protection for the essential principles of this invention.

What I claim and desire to secure by Letters Patent is:

1. In a gear-shaping machine, having means for effecting relative planing movement between a gear-formed cutter and a gear blank, and means for giving simultaneous rotary generative movements to the cutter and work piece; means for imparting additionally to one of the members of the couple constituted by the cutter and gear blank a relative rotational movement such that the toothlike projections on the cutter are caused to overlap the teeth cut in the gear blank at one side thereof, whereby further operation of the machine in a normal manner effects side-trimming of the teeth previously cut.

2. In a gear-cutting machine, the combination of a gear-shaped planing cutter, a work spindle adapted to carry a gear blank, mechanism for effecting relative reciprocatory movements between the cutter and the work spindle, mechanism for producing rotational movement of the cutter and gear blank in the manner of a pair of meshing gears, whereby teeth are generated and cut in the gear blank, and means for so changing the relative positions of the cutter and gear blank after the cutting of a series of teeth in the blank that further movements of the cutter and gear blank in the manner described cause the teeth so cut to be trimmed at one side of each.

3. A gear-shaping machine, comprising rotatable spindles, one of which is adapted to carry a gear-formed planing cutter having cutting edges on one end-face and the other to carry a gear blank, means for rotating said spindles in unison and in such direction that the pitch circles of the cutter and blank are caused to roll at the same linear speed, means for reciprocating one of said spindles in the direction of the length of the cutter spindle, and means for displacing one of said spindles angularly relatively to the other after a series of teeth has been cut in the gear blank, whereby further operations of the cutter cause the teeth so cut to be trimmed on one side.

4. A gear shaper, comprising a cutter spindle and a work spindle rotatively mounted on adjacent axes, an index gear wheel associated with each of the spindles, gearing driving said index wheels simultaneously at given speeds of rotation in predetermined directions, one of said spindles being movable endwise, means for moving the last-named spindle back and forth endwise, a cam driven in unison with said index wheels, an endwise movable bar engaging said cam and controlled as to its position thereby, and mechanism operated by movement of said bar for shifting one of the said index driving gears in such manner that the speed of rotation of the index wheel controlled thereby, relatively to that of the other index wheel, is temporarily altered.

5. A gear-shaping machine, comprising cutter and work spindles mounted rotatively adjacent to each other, index gear wheels connected respectively with said spindles, one of the spindles being movable endwise, means for so moving the last-named spindle back and forth, driving gear elements associated with the respective index wheels, and means for so shifting one of said gear elements that the speed of one index wheel is temporarily changed relative to the speed of the other index wheel.

6. A machine for generating and cutting teeth in gears, comprising a gear-blank holder, a cutter holder, a planing cutter having a cutting edge arranged like the outline of a spur gear and being carried by said cutter holder, means for rotating the holders at such speeds that the cutter and gear blank respectively carried by them are rotated in opposite directions at equal linear speeds at their pitch circles, means for moving one of said holders in the direction of the axis of the cutter, and means for temporarily altering the speed of rotation of one of the holders relatively to the other at a predetermined point in the cycle of operations of the machine.

7. A side-trimming gear-generating machine, comprising cutter and work holders, index worm wheels connected to the respective holders, worms normally rotated simultaneously at predetermined rates of speed in mesh with the respective worm wheels, mechanism, including a cam, driven continuously while the machine is in operation, and a cam follower controlled by said cam arranged to operate for causing a limited change in the speed of rotation imparted to one of the index wheels.

8. In a gear-shaping machine having rotative cutter and work spindles, one of which is also reciprocable endwise relatively to the other, worm and wheel gear couples associated with each of said spindles for rotating them, a cam driven continuously when the machine is in operation, a follower bearing against said cam, said cam having an offset of limited angular duration in its follower-controlling surface, and means whereby displacement of said follower under the control of said offset causes one of the worms to be so altered in its relation to the co-operative worm gear that the rate of rotation of the spindle controlled thereby is temporarily altered.

9. A gear-shaping machine, comprising, in combination with a rotatable and reciprocative gear-shaped planing cutter and a rotatable work holder, worm and wheel gearing connected with said cutter and work holder respectively and being driven simultaneously at such speeds and in such directions of rotation as to cause the cutter and the work piece carried by the work holder to roll together in the manner of a pair of intermeshing gears, whereby to generate the forms of the teeth being cut in the work piece by the reciprocative movements of the cutter, a cam, a cam follower controlled by the cam, and means by which said follower in being displaced causes the rate of rotation of the cutter relatively to the work holder to be altered.

10. A gear-shaping machine, comprising in combination with a rotatable and reciprocative gear-shaped planing cutter and a rotatable work holder, worm and wheel gearing connected with said cutter and work holder respectively and being driven simultaneously at such speeds and in such directions of rotation as to cause the cutter and the work piece carried by the work holder to roll together in the manner of a pair of intermeshing gears, whereby to generate the forms of the teeth being cut in the work piece by the reciprocative movements of the cutter, a cam, a cam follower controlled by the cam, and means by which said follower in being displaced causes the rate of rotation of the cutter relatively to the work holder to be altered, said cam having two offsets in its circumference, one of which offsets causes displacement of the follower in one direction, and the other of which causes displacement in the relatively opposite direction, and the cam being otherwise formed to cause no displacement of the follower.

11. A gear-shaping machine, having means for cutting gear teeth in a work piece by the planing action of a cutter having its cutting edge similar to the outline of a gear, and including means for causing the tooth-like projections of said cutter thereafter to trim, on one side only of each, the teeth so cut.

12. A gear-shaping machine, having mechanism organized and arranged to cause a succession of longitudinal planing cuts between a gear-shaped cutter and a gear blank, with rolling motion between said cutter and blank similar to the motion of a pair of intermeshing gears, whereby tooth forms are generated and cut in the gear blank, and means arranged to cause such shifting of the cutter relatively to the blank after cutting a series of teeth in the latter that one side of each cutter tooth when in the position for cutting is caused to overlap one side only of the adjacent tooth previously cut in the blank, whereby the cutter is caused to trim one side only of each of the teeth previously cut in the blank.

13. A gear generating machine comprising the combination with a cutting tool, a work holder and mechanism for effecting relative cutting and generating movements between such cutter and a gear blank carried by said work holder, of means for effecting a relative displacement between the work holder and cutter of the same nature as said generative movement, whereby the continuance of said cutting movements causes trimming on one side of the teeth previously cut.

14. A gear generating machine comprising a cutter, a holder adapted to carry a gear blank in cooperative relation with the cutter, means for actuating the cutter in a manner to cut into said gear blank, means for causing relative movements to take place in the course of such cutting action between the cutter and gear blank in the manner of rolling mesh between gear elements respectively similar thereto, whereby tooth forms are generated in the blank, and means for displacing the cutter or the gear blank relatively to the other, after the entire series of teeth have been cut, in such fashion that continuance of the cutting and generating actions causes such teeth to be cut further on one side thereof.

15. A gear cutting machine including a work support adapted to hold and rotate a gear blank, a cutter holder adapted to mount a gear cutter, mechanism for effecting relative cutting travel and indexing travel between the cutter and work piece for causing a series of tooth forming cuts to be made in the work piece, and means for causing a circumferential shift in the relation between the cutter and work piece in the cycle of ordinary cutting and indexing movements, whereby in the continuing operation of the machine the teeth previously cut are trimmed off on one side by the cutter.

16. A gear cutting machine comprising the combination with a work holder adapted to support and rotate a gear blank, a cutter holder adapted to support and move a gear cutter, and mechanism for causing relative cutting and indexing movement to occur between the work holder and cutter holder, whereby to cut a series of teeth in the work, of means for causing a relative peripheral shift between the cutter and work piece after a series of teeth have been cut in the latter, whereby to enable the cutter in the subsequent action of the machine to trim the previously cut teeth on one side.

In testimony whereof I have affixed my signature.

EDWARD W. MILLER.